March 31, 1970 R. G. PETERSON 3,503,282
MULTISPEED TRANSMISSION
Filed July 8, 1968
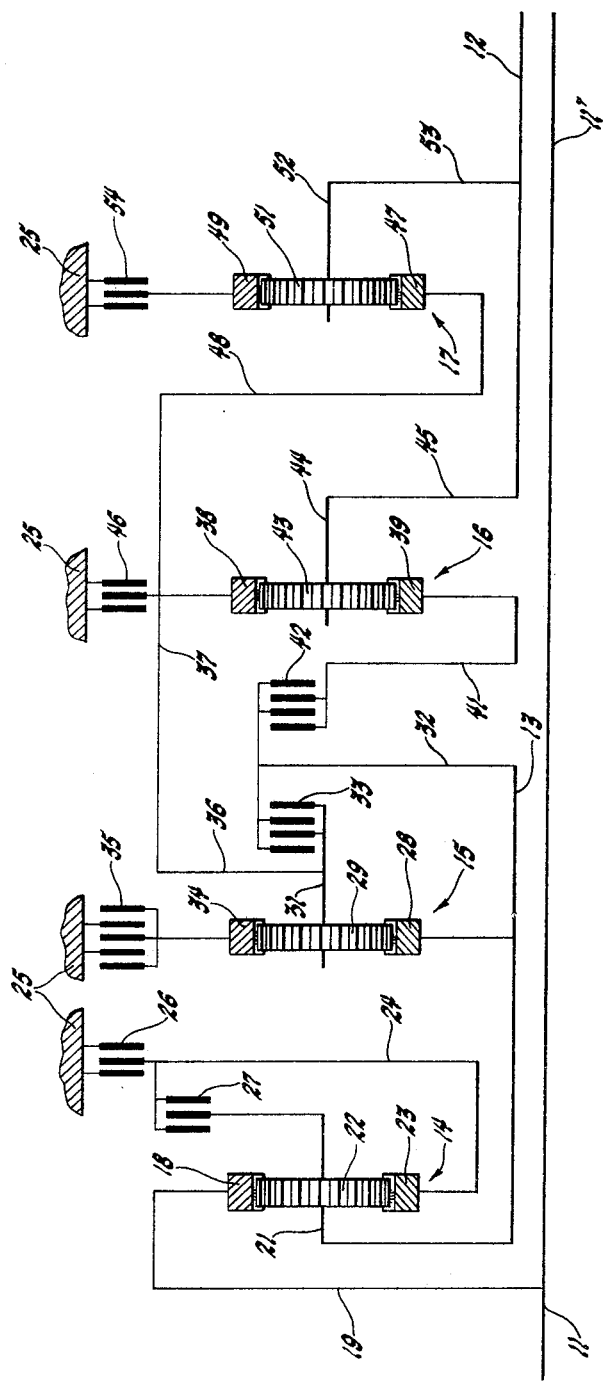
INVENTOR.
Ronald G. Peterson
BY
a. M. Heiter
ATTORNEY

United States Patent Office 3,503,282
Patented Mar. 31, 1970

3,503,282
MULTISPEED TRANSMISSION
Ronald G. Peterson, Indianapolis, Ind., assignor to General Motors Corporation, Detroit, Mich., a corporation of Delaware
Filed July 8, 1968, Ser. No. 743,227
Int. Cl. F16h 57/10
U.S. Cl. 74—759                                          5 Claims

ABSTRACT OF THE DISCLOSURE

A multispeed ratio gearing arrangement in which a planetary splitter unit having two output speeds continuously drives one range planetary unit and selectively drives another range planetary unit which is connected to the transmission output is herein disclosed. The two range planetary units are drivingly connected to a forward-reverse planetary, which is also connected to the output, such that selective combinations of drive paths established by engagement of seven friction drive establishing devices, which control the drive ratio of the planetary units, provides ten forward drive ratios and two reverse drive ratios.

---

This invention relates to multispeed gearing arrangements and more particularly to gearing arrangements in which a splitter unit is combined with two range units and a forward-reverse unit to provide a plurality of drive paths and speed ratios.

In the present invention, a planetary splitter unit having input, output, and reaction members and two drive establishing devices provides a continuous input drive to one range unit having input, output, and reaction members and two drive establishing devices and selective input drive through a drive establishing device to another range unit having input, output and reaction members and one drive establishing device. The output member of the continuously driven range unit is connected to the reaction member of the selectively driven range unit and to an input member of a forward-reverse unit which also has an output member, a reaction member and a drive establishing device. The output members of the selectively driven range unit and the forward-reverse unit are connected to the output shaft of the transmission.

Selective engagement of the drive establishing devices will produce ten forward speeds and two reverse speeds. The splitter unit is combined with the continuously driven range unit and the forward-reverse unit to provide four forward drive ratios. The splitter unit is combined with both range units to provide four other forward drive ratios. The splitter unit is combined with the selectively driven range unit to provide two forward drive ratios and with the selectively driven range unit and the forward-reverse range unit to provide two reverse drive ratios.

The gearing arrangement of the present invention is similar to the gearing shown in FIGURE 1 of the U.S. patent to Christenson et al. 3,096,666. However, by separating the one range unit from the splitter output and making it selectively connectable to the output of the splitter, through the use of a range clutch, four additional forward drive ratios are provided to extend the ratio coverage capable with this gearing.

It is an object of this invention to provide an improved multi-ratio gearing arrangement having extended ratio coverage.

A further object of this invention is to provide in an improved gearing arrangement four planetary gear units and associated drive establishing devices which may be selectively combined to provide ten forward drive ratios.

Another object of this invention is to provide a gearing arrangement having a splitter unit continuously driving one range and selectively driving another range unit, and a forward-reverse unit driven by the range units whereby selective engagement of a plurality of drive establishing devices associated with the units will provide ten forward ratios and two reverse ratios.

It is another object of this invention to provide in a transmission a forward-reverse planetary gear unit selectively operable in combination with either a continuously driven range unit or a selectively driven range unit to provide forward or reverse drive ratios.

These and other objects of the invention will be more fully apparent from the following description and schematic drawing of the gearing arrangement and the drive establishing devices associated therewith.

Referring to the schematic diagram, there is shown an input shaft 11, an output shaft 12 rotatably mounted on the input shaft 11, an intermediate input shaft 13 also rotatably mounted on the input shaft 11, and four planetary gear units generally designated 14, 15, 16 and 17. The input shaft extends through the transmission to provide a power take-off at its right end 11'. The planetary gear unit 14 is a ratio splitter unit having an input ring gear 18 drivingly connected to the input shaft 11 by a hub 19, an output carrier member 21 drivingly connected to the intermediate shaft 13 and having rotatably mounted on the carrier a plurality of pinion gears 22 which mesh with the ring gear 18 and a reaction sun gear 23. The reaction sun gear 23 is drivingly connected to a hub 24 which may be selectively connected to the transmission housing 25 through a selectively engageable drive establishing device such as brake 26 or connected to the carrier 21 through a selectively engageable drive establishing device such as lockup clutch 27. When the brake 26 is engaged, the sun gear 23 is stationary such that upon rotation of the ring gear 18, the carrier 21 will rotate in the same direction as the ring gear 18 but at a reduced speed. Upon engagement of the clutch 27, the sun gear 23 and the carrier 21 are drivingly connected to provide a "lockup" in the planetary set 14 so that it will rotate as a single unit when the ring gear 18 is rotated.

The range planetary set 15 has an input sun gear 28 which is drivingly connected to the intermediate input shaft 13 and thus continuously driven by carrier 21 of the splitter planetary set 14. The sun gear 28 is in mesh with a plurality of pinions 29 which are rotatably mounted on a carrier member 31 which may be selectively connected to the intermediate input shaft 13 and sun gear 28 through a hub 32 and the selectively operable friction drive establishing device such as the lockup clutch 33. The pinion gears 29 also mesh with a reaction ring gear 34 which may be selectively grounded to the transmission housing 25 by a friction drive establishing device such as the brake 35. The carrier 31 provides an output member for the planetary unit 15 and is drivingly connected to a hub 36 and through a drum 37 to a ring gear 38 of the range planetary set 16. The planetary set 16 also has an input sun gear 39 which is drivingly connected to a hub 41 which may be selectively connected through a selectively operable drive establishing device such as clutch 42 to the hub 32 and the intermediate input shaft 13. Thus, the sun gear 39 may be selectively connected to the intermediate input shaft 13 to be driven by the carrier member 21 of the planetary set 14. A plurality of pinions 43 mesh with the ring gear 38 and the sun gear 39 and are rotatably mounted on an output carrier element 44 which is drivingly connected through a hub 45 to the output shaft 12. The drum 37 and, therefore, the ring gear 38 may be selectively grounded to the transmission housing 25 by a selectively operable drive establishing device such as the brake 46. Thus the ring gear 38 may be either the reaction element or a secondary input element depending upon whether the drum 37 is grounded by brake 46 or driven by carrier 31 of the planetary set 15.

The drum 37 is drivingly connected to an input sun gear 47 of the planetary set 17 through a hub 48. The planetary set 17 also includes a ring gear 49, a plurality of pinions 51 meshing with the sun gear 47 and the ring gear 49 and is rotatably mounted on an output carrier member 52 which is drivingly connected to the output shaft 12 through a hub 53. The ring gear 49 may be selectively grounded to the transmission housing 25 through a selectively operable drive establishing device such as is brake 54 thus providing a reaction member for the planetary set 17.

The drive establishing devices used with this gear arrangement, may be any of the well known disc type or band type which are selectively engageable by mechanical, electrical, hydraulic or pneumatic-automatic control means.

To establish first forward drive ratio, the brakes 26, 35 and 54 are engaged thus establishing sun gear 23, ring gear 34 and ring gear 49 as reaction members. With these reaction members established, the drive path is from the input shaft 11 through the hub 19, ring gear 18, carrier 21, intermediate input shaft 13, sun gear 28, carrier 31, hub 36, drum 37, hub 48, sun gear 47, carrier 52 and hub 53 to the output shaft 12.

To establish the forward second drive ratio, the brake 26 is released while the clutch 27 is engaged thus providing a locked-up condition in the planetary set 14. The drive path in this ratio is similar to the drive path for the first ratio except that the planetary set 14 rotates as a unit.

To establish third speed forward, the clutch 27 and brake 35 and brake 54 are disengaged while the brakes 26 and 46 and the clutch 42 are engaged. The drive path is from the input shaft 11 through hub 19, ring gear 18, carrier 21, intermediate input shaft 13, hub 32, clutch 42, hub 41, sun gear 39, carrier 44 and hub 45 to the output shaft 12.

To establish fourth speed forward, the brake 46 and clutch 42 are disengaged while the brake 54 and clutch 33 are engaged and brake 26 remains engaged. The drive path, thus established, is similar to the drive path for the first ratio except that the planetary set 15 rotates as a unit.

To establish the fifth drive ratio, the brakes 26 and 54 and clutch 33 are disengaged while the brake 46 and clutches 27 and 42 are engaged. The drive path thus established is similar to the drive path for the third speed except that the planetary unit 14 rotates as a unit.

To establish the sixth speed, the brake 46 and clutch 42 are disengaged while the clutch 33 and brake 54 are engaged and the clutch 27 remains engaged. The drive path thus established is similar to the fourth speed except that the planetary set 14 rotates as a unit.

To establish the seventh speed, clutches 27 and 33 and brake 54 are disengaged while brakes 26 and 35 and clutch 42 are engaged. The drive path thus established is from the input shaft 11 to hub 19, ring gear 18, carrier 21 to the intermediate input shaft 13. From the intermediate input shaft 13, the drive path is split, one portion being through hub 32, clutch 42, hub 41, sun gear 39, carrier 44, and hub 45 to the output shaft 12 and the other portion being through sun gear 28, carrier 31, hub 36, drum 37, ring gear 38, carrier 44, and hub 45 to the output shaft 12.

To establish the eighth speed, the brake 26 is disengaged while the clutch 27 is engaged and the brake 35 and clutch 42 remain engaged. The drive path thus established is similar to the seventh sped except that the planetary set 14 is locked up to provide a one-to-one drive.

To establish ninth speed, the clutch 27 and brake 35 are disengaged while the brake 26 and clutch 33 are engaged and the clutch 42 remains engaged. When the clutches 33 and 42 are engaged simultaneously, the planetary sets 15 and 16 are both in a locked-up or one-to-one drive condition so that they will both rotate in unison, driving the output shaft with them when the intermediate input shaft 13 is rotated. Thus the drive path established is a reduction drive through the planetary set 14 and one-to-one drive in the planetary sets 15 and 16 to output shaft 12.

To establish the tenth speed forward, the brake 26 is disengaged and the clutch 27 is engaged while the clutches 33 and 42 remain engaged thus providing a lockup condition in the planetary sets 14, 15 and 16 so that the output shaft 12 rotates in unison with the input shaft 11.

To establish first reverse ratio, the brake 26 and 54 and clutch 42 are engaged. The drive path thus established is from the input shaft 11 through the planetary set 14 at reduced ratio, through the clutch 42 to the sun gear 39. Initially, the carrier 44 provides a reaction for the planetary set 16 so that when the sun gear 39 is rotated forwardly, the ring gear 38 rotates in reverse driving the drum 37, hub 48 and sun gear 47 with it. Since the ring gear 49 is grounded, the carrier 52 rotates in the same direction as sun gear 47, which is opposite the input shaft 11, but at a reduced ratio.

To establish second speed reverse, the brake 26 is disengaged while the clutch 27 is engaged thus providing the lockup condition in the planetary set 14. The drive path thus established is similar to the first ratio reverse path except that the planetary set 14 is driven at a one-to-one ratio.

Thus, as described above and shown in the chart below, the first forward ratio is a reluction ratio from input shaft 11 to the output shaft 12 employing reduction drives in the splitter planetary unit 14, continuously driven range planetary unit 15 and forward-reverse planetary unit 17. The second forward ratio employs a one-to-one ratio in splitter planetary unit 14 and reduction ratios in the continuously driven range and forward-reverse planetary units 15 and 17. The third forward ratio encompasses a reduction ratio through both the splitter and selectively driven range planetary units 14 and 16. The fourth forward ratio uses reduction in the splitter planetary unit 14, a one-to-one ratio in the continuously driven range planetary unit 15 and a reduction in the forward-reverse planetary unit 17. The fifth forward ratio employs a one-to-one ratio in the splitter planetary unit 14 and a reduction ratio in the selectively driven range planetary unit 16. The sixth forward ratio uses a one-to-one ratio in the splitter and continuously driven range planetary units 14 and 15 and a reduction ratio in the forward reverse planetary unit 17. The seventh ratio is a dual path drive with reduction ratio in the splitter, continuously driven range, and selectively driven range planetary units 14, 15 and 16. The eighth forward ratio is also a dual path drive with a one-to-one ratio in the splitter planetary unit 14 and reduction ratios in the continuously driven and selectively driven range units 15 and 16. The ninth forward ratio is another dual path drive with a reduction ratio in the splitter planetary unit 14 and one-to-one drive ratios in the continuously driven and selectively driven range planetary units 15 and 16. Thus, it is obvious that the ratios first through ninth employ an overall reduction ratio between the input shaft 11 and the output shaft 12. The tenth forward ratio is a one-to-one drive from the input shaft 11 to the output shaft 12.

The two reverse ratios are reduction drive from input to output in which the selectively driven range planetary unit 16 and the forward-reverse planetary unit 17 provide a reduction ratio in both reverse drives while the splitter planetary unit 14 provides a reduction ratio in first reverse and a one-to-one ratio in second reverse.

PLANETARY GEAR SET

| Drive Range | 14 Red. Ratio | 14 One to One | 15 Red. Ratio | 15 One to One | 16 Red. Ratio | 16 One to One | 17 Red. Ratio | Overall Trans. Ratio |
|---|---|---|---|---|---|---|---|---|
| Forward: | | | | | | | | |
| 1 | X | | X | | | | X | Reduction. |
| 2 | | X | X | | | | X | Do. |
| 3 | X | | | | X | | X | Do. |
| 4 | X | | | X | | | X | Do. |
| 5 | | X | | | X | | X | Do. |
| 6 | | X | | X | | | X | Do. |
| 7 | X | | X | | X | | | Do. |
| 8 | | X | X | | X | | | Do. |
| 9 | X | | | X | | X | | Do. |
| 10 | | X | | X | | X | | |
| Reverse: | | | | | | | | |
| 1 | X | | | | X | | X | One to one reduction. |
| 2 | | X | | | | X | X | Do. |

Many modifications may be made of the above described illustrative embodiment of the invention defined in the appended claims.

What is claimed is:

1. In a transmission gearing arrangement a driving member; a driven member; ratio splitter planetary gear means having splitter input member drivingly connected to said driving member, a splitter output member and a plurality of drive establishing means selectively operable to provide a reduced ratio and a higher ratio between said splitter input member and said splitter output member; continuously driven range planetary gear means having a first range input member continuously driven by said splitter output member, a first range output member and a plurality of drive establishing means selectively operable to provide a reduced ratio and a higher ratio between said first range input member and said first range output member; a selectively driven range planetary gear means having a second range input member, a second range output member drivingly connected to said driven member, a secondary input element drivingly connected to said first range output member, and drive establishing means selectively operably connected to said secondary input element for preventing rotation thereof to establish a reduced ratio between said second range input and second range output members; range drive establishing means selectively operatively connected between said splitter output member and said second range input member for providing a selective drive therebetween; and forward reverse planetary gear means having input means drivingly connected to said secondary input element and said first range output member, output means drivingly connected to said driven member, reaction means and selectively operable drive establishing means selectively operatively connected to said reaction means for providing a reduced ratio between said input and output means, whereby selective operation of various combinations of said selectively operable drive establishing means will provide a plurality of forward and reverse ratios.

2. A transmission including input planetary gear means; output means; continuously driven planetary range gear means including an input member drivingly connected to and continuously driven by said input planetary gear means, and an output member; hub and drum drive means drivingly connecting said output member to said output means; selectively operable drive establishing means operatively connected to said input planetary gear means; and selectively driven planetary range gear means including an input element operatively connected to said selectively operable drive establishing means, and an output element drivingly connected to said output means.

3. The invention defined in claim 2 and said continuously driven planetary range gear means further including selectively operable lockup clutch means and said selectively driven planetary range gear means further including a secondary input element drivingly connected to said hub and drum drive means; said lockup clutch means and said drive establishing means being simultaneously operable to provide a one-to-one ratio in both said continuously driven and selectively driven planetary range gear means.

4. The invention defined in claim 3, said transmission being operable to provide forward and reverse drive ratios, and said output means including an output shaft and forward-reverse planetary gear means including input gear means drivingly connected to said hub and drum drive means, and forward-reverse output means drivingly connected to said output shaft; said forward-reverse planetary gear means being selectively operable in combination with said continuously driven planetary range gear means to provide forward ratios between said planetary gear input means and said output shaft and with said selectively driven planetary range gear means to provide reverse ratios between said input planetary gear means and said output shaft.

5. A transmission having forward and reverse drive ratios including a driving member; and output shaft; and intermediate shaft; planetary splitter gear means including a splitter input ring gear drivingly connected to said driving member, a splitter output carrier drivingly connected to said intermediate shaft, a splitter reaction sun gear, selectively operable splitter brake means for selectively restraining said splitter reaction sun gear, and selectively operable clutch means for selectively operatively connecting said splitter sun gear and carrier; a continuously driven range planetary gear means including an input sun gear member drivingly connected to said intermediate shaft, a reaction ring gear member, an output carrier member, selectively operable range brake means for selectively restraining said reaction ring gear member and selectively operable range lockup clutch means for operatively connecting said input sun gear member and said output carrier member; selectively operable range drive clutch means operatively connected to said intermediate shaft; selectively driven range planetary gear means including an input sun gear element operatively connected to said range drive clutch means, an output carrier element drivingly connected to said output shaft, a reaction ring gear element and selectively operable brake means for restraining said reaction ring gear element; forward-reverse planetary gear means including an input sun gear, an output carrier drivingly connected to said output shaft, a reaction ring gear and selectively operable forward-reverse brake means for restraining said reaction ring gear; and connecting means for drivingly connecting said output carrier member, said reaction ring gear element and said input sun gear.

References Cited

UNITED STATES PATENTS

| | | | |
|---|---|---|---|
| 2,912,884 | 11/1959 | Christenson et al. | 74—759 |
| 3,053,116 | 9/1962 | Christenson et al. | 74—645 X |
| 3,096,666 | 7/1963 | Christenson et al. | 74—645 |
| 3,293,934 | 12/1966 | Schaefer et al. | 74—759 X |

ARTHUR T. McKEON, Primary Examiner